Nov. 19, 1940.       H. L. BLOOD       2,222,307
OFFSETTING ARRANGEMENT FOR BORING TOOLS AND THE LIKE
Filed April 9, 1937       2 Sheets-Sheet 1
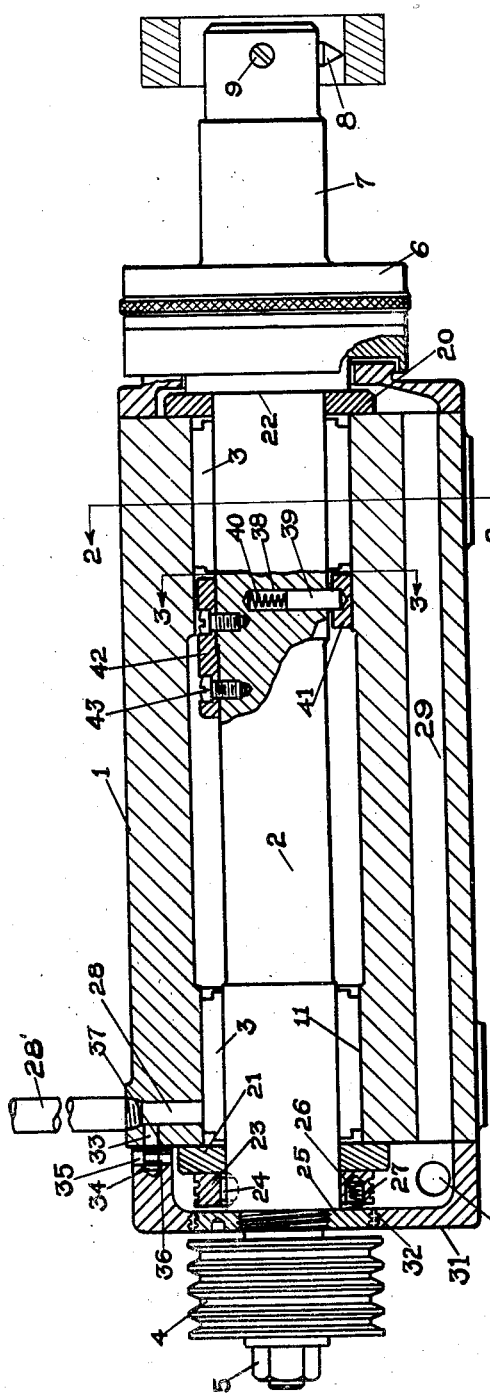
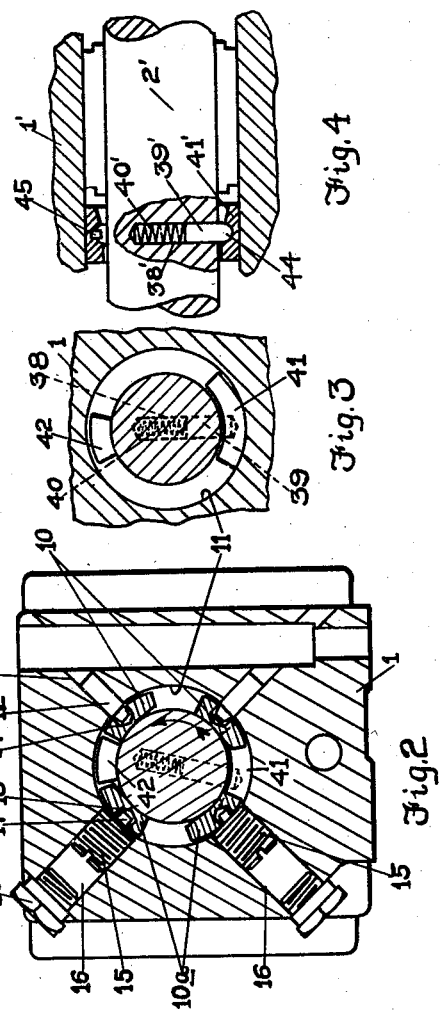
Inventor
Harold L. Blood
By Geo. H. Kennedy Jr.
Attorney Nov. 19, 1940.   H. L. BLOOD   2,222,307
OFFSETTING ARRANGEMENT FOR BORING TOOLS AND THE LIKE
Filed April 9, 1937   2 Sheets-Sheet 2

₵ of SPINDLE – ROTATING
₵ of SPINDLE – AT REST

Inventor
Harold L. Blood
By Geo. H. Kennedy Jr.
Attorney

Patented Nov. 19, 1940

2,222,307

UNITED STATES PATENT OFFICE 2,222,307

OFFSETTING ARRANGEMENT FOR BORING TOOLS AND THE LIKE

Harold L. Blood, Worcester, Mass., assignor to The Heald Machine Company, Worcester, Mass., a corporation of Massachusetts Application April 9, 1937, Serial No. 135,968

7 Claims. (Cl. 77—3)

The present invention relates to an arrangement by which a rotary spindle, such as used in boring, grinding and like operations, may be offset slightly at the conclusion of such operation, so that upon withdrawal of the tool from within the bore of the workpiece the tool will be spaced from the surface of the bore and will leave no mark thereon.

In many boring machines, the axis of the boring bar is in fixed radial relation to the axis of the workpiece; thus as the tool is withdrawn from the bore of the workpiece, the tool leaves a spiral scratch or score in the finished surface, if the spindle is rotating, or a straight groove parallel to the axis of the workpiece, if the spindle is not rotating. This spiral or straight score or groove, being extremely small in cross-section, does not ordinarily affect the use of the workpiece, but, in certain instances, does decrease the salability thereof by reason of its appearance. Several arrangements have been developed for avoiding the formation of this groove during the withdrawal of the boring or other tool, one example of an arrangement of this character being shown in the Schmidt Patent No. 2,058,359, in which the tool in the end of the rotating boring spindle is automatically retracted by stoppage of the spindle. This arrangement is entirely satisfactory for practically all types of boring operations, especially when used on a machine which automatically stops the spindle before axial separation of the tool and work occurs. The present invention is another arrangement by which the boring or other tool may be offset slightly from normal operative position automatically by stopping the spindle rotation, and, being of a relatively simple construction, has a wide field of use.

For example, in case the workpiece is mounted for rotation and the tool held in fixed position, radially thereof, as in the turning of the outer surfaces of workpieces or in the boring of relatively large diameter bores, a slight offsetting or radial movement between the tool and the workpiece for preventing marring of the finished work surface during withdrawal of the tool is desirable. To obtain this relative radial shifting movement the spindle carrying the workpiece is, by utilizing the structure of the present invention, shifted laterally of the spindle housing, thus shifting the workpiece on the end of the spindle away from the tool. The structure of the present invention is equally effective in internal grinding machines for procuring a back-off of the wheel relative to the workpiece, this back-off resulting from the incorporation of the structure of the present invention in either the grinding wheel head or the workhead.

Rocking shoe bearings have been used for the support of rotating spindles, as shown for example in the Haas Patent No. 2,072,814. It is well known that rocking shoes of this type will accommodate themselves to a film of oil between each shoe and the surrounding continuous bearing surface in such manner that a plurality of wedge shaped oil pockets are formed when relative rotation occurs between the shoes and the continuous bearing surface. This relative motion wipes the lubricant in at the leading edges of the shoes causing each shoe to rock into a position which leaves a wedge-shaped space between the shoe and the associated bearing surface. When the relative motion between the shoes and the continuous bearing surface is discontinued the lubricant is no longer wiped in at the leading edge of each shoe and the pressures which were built up by the relative motion are greatly reduced so that each shoe then, by its ability to rock and to accommodate itself to the oil film thickness may permit a slight offsetting movement of the spindle away from its normal operative axis of rotation. The present invention takes advantage of this available displacement in procuring a lateral shifting movement of the spindle within the supporting structure.

According to the present invention the spindle, whether it be used for supporting a workpiece, a grinding wheel, or a boring tool, is mounted for rotation in rocking shoe bearings so arranged that when the spindle is at rest, a slight play in the spindle is available, which makes possible the radial or lateral shifting of the spindle within its support by a slight amount. This lateral shifting of the spindle may be utilized to provide a relative radial movement between the workpiece and the tool.

Other and further objects and advantages of the invention will appear from the following detailed description taken in connection with the accompanying drawings in which—

Fig. 1 is a sectional view through a boring head embodying the invention, with parts broken away.

Fig. 2 is a sectional view along the line 2—2 of Fig. 1.

Fig. 3 is a sectional view along the line 3—3 of Fig. 1.

Fig. 4 is a fragmentary sectional view of a modification.

Like reference characters refer to like parts in the different figures.

Figure 5:
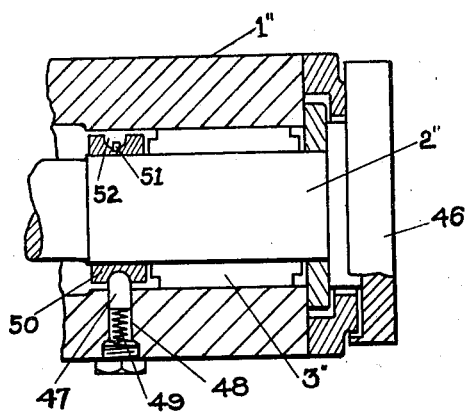
Fig. 5 is a horizontal sectional view illustrating the invention as applied to a work-carrying spindle.

As applied to a boring head, the invention is intended for use on any of the familiar types of boring machines, one example of which is disclosed in the Schmidt Patent No. 2,058,359. In machines of this character, the base generally has a reciprocable table or carriage thereon, on which either the workpiece to be bored or the boring head is mounted, the other of these elements being mounted on a bridge which is secured to the base of the machine at one end of the table.

The movement of the table procures a relative axial movement between the workpiece and the boring tool for a boring operation on the workpiece, and subsequently a withdrawal of the tool from within the workpiece bore by movement of the table in the opposite direction. Prior to reversal of the table movement and after the boring tool has completed its action on the workpiece, the rotating boring spindle is stopped, and it is this stopping of the spindle which is used to procure a radial retraction of the tool from operative position. The mechanism for stopping the spindle rotation is fully disclosed in the Schmidt patent above referred to, and, as it is not a feature of the present invention, will not be described in detail.

As shown in Fig. 1, a boring head according to the invention comprises a housing 1 having a spindle 2 journalled therein on suitable axially spaced bearings of any suitable construction. The bearings shown are rockable bearing shoes 3 hereinafter described in detail. The spindle has a pulley 4 at one end thereof, secured against relative rotation thereon by a clamping nut 5 and a suitable key, not shown, to provide for rotation of the spindle from a driving motor on the base of the machine. On the other end of the spindle is mounted a cap 6 having an integral projecting stud 7 in axial alinement with the spindle 2. A boring tool 8 is mounted in the end of the stud and projects radially therefrom, as will be apparent. It will be clear that the cap 6 may, if desired, be integral with the spindle 2 and during the use of the boring head the cap 6 is functionally integral with the spindle. A provision is made for adjustment of the tool radially within the end of the stud, as by a suitable clamping screw 9.

As shown in Fig. 2, each set of the bearings 3 comprises a plurality of rocking shoes 10 and 10a, each shoe preferably having its inner surface curved on a slightly greater radius of curvature than the radius of curvature of the periphery of the spindle 2. The outer surface of each shoe has a slightly smaller radius of curvature than the radius of curvature of the bore 11 in which the shoes are positioned. The shoes 10 are held in position by locating pins 12 which are positioned in bores 13 in the housing 1 with the ends of the pins engaging in recesses 14 in the outer surfaces of the shoes. The diameter of each recess 14 is slightly greater than the diameter of the associated pin 12 so that the outer surface of each shoe is free to engage with the bore 11.

Since the curvature of the shoes 10 is greater than that of the bore 11 the shoes have a line contact with the bore and may thus rock slightly during the operation of the head.

The other two adjacent shoes 10a are adjustable by means of threaded plugs 15 located in bores 16 in the housing 1. Each of the plugs 15 has a projecting pin 17 engaging in a recess 18 in the corresponding rocking shoe and the diameter of the pin 17 is such that the outer surface of the shoe may rest upon the end of the plug 15. The surfaces of the shoes 10a have a curvature similar to the shoes 10 and the outer surface of each of the shoes 10a thus has a line contact with the end of the plug 15. Suitable caps 19 may close the ends of the bores 16 if desired.

Rocking shoe bearings of this character run in a bath of oil, which, in the present instance, is sealed within the bore 11 by rings 20 and 21 at opposite ends of the bore. The ring 20 engages a shoulder 22 on the spindle 2 and is held against the end of the housing to close the bore 11 by the resilient mechanism (hereinafter described) which continually urges the entire spindle toward the left, Fig. 1. The ring 21 surrounds the spindle 2 at the left hand end of the bore 11 and is held against the end of the bore by a collar 23 slidable on the spindle 2 and held against rotation thereon by a key 24. The spindle has a threaded ring 25 thereon adjacent to the collar 23, and coil springs 26 located in recesses 27 angularly spaced in the collar 23 and positioned for engagement with the ring 25, tend to urge the entire spindle as a unit to the left, thereby holding the rings 20 and 21 against the opposite ends of the bore 11.

A channel 28 in the housing 1 provides for admission of oil to the bore 11 to assure a sufficient supply of oil to the bearings. The housing 1 also has a channel 29 connected to a drain plug 30 to carry off any oil leaking out past the rings 20 or 21. The drain plug 30 is located in a cap 31 suitably secured to, and functionally integral with, the end of the housing 1 and having an inwardly extending flange 32 substantially flush with the ring 25.

The housing 1 and cap 31 have alined small channels 33 and 34, the former communicating with the oil channel 28. A pin 35 has a tight fit in a bore 36 intersecting the channel 34 and a groove 37 of very small dimension provides a communication between the channel 34 and the inside of the cap 31. The groove 37 (greatly exaggerated in the drawing) acts as an air vent for air accumulating in the oil used for lubrication.

For efficient operation of rocking shoe bearings the oil is directed into the bore 11 around the spindle 2 under pressure which may be a gravity feed as by the vertically extending pipe 28', or in certain cases, may be connected directly to the fluid pressure system which controls the machine on which the boring head is mounted. In any event the pressure of the oil is such as to obtain a satisfactory operation of the rocking shoe bearings.

Figure 6:
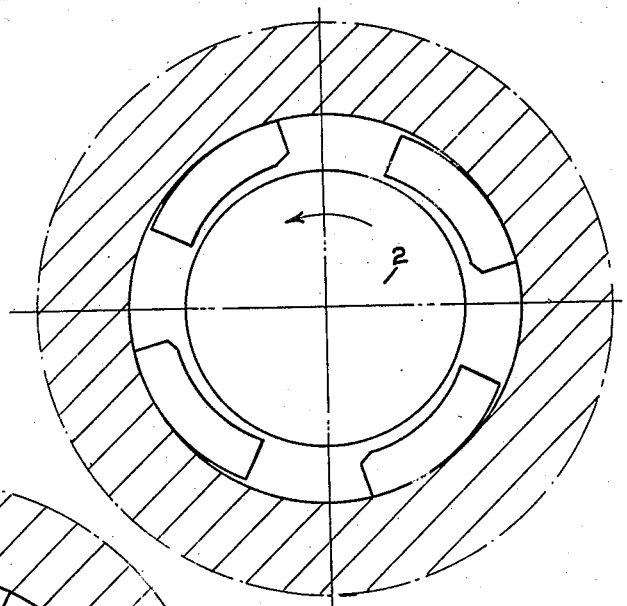
Fig. 6 is a diagrammatic sectional view showing the positions of the bearing shoes when the spindle is rotating.
Figure 7:
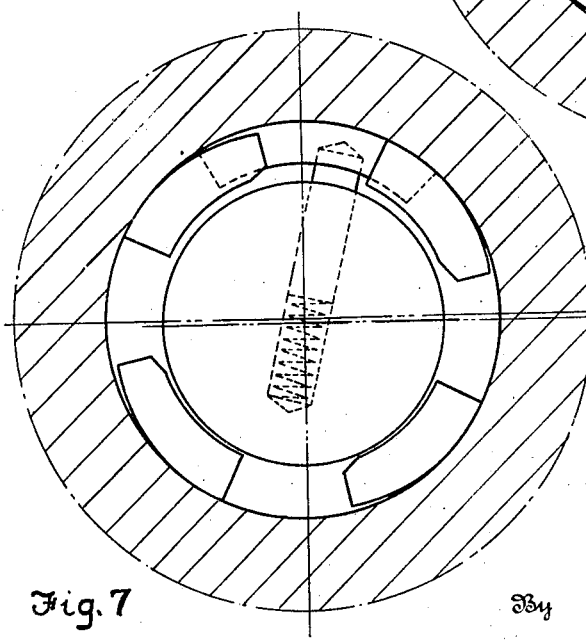
Fig. 7 is a diagrammatic sectional view showing the shoes when the spindle is at rest.

With reference to Figs. 6 and 7, when the spindle 2 begins to rotate (in a counterclockwise direction), the lubricating medium is drawn between each rocking-shoe and the spindle by reason of the adhesiveness of the oil to the spindle. The surface layer of molecules of the oil adjacent the spindle are first drawn in between the surfaces of the spindle and bearing shoes, and, since the oil has inter-molecular friction, or what is commonly called viscosity, other adjacent molecules of oil are drawn into the bearing space. This causes the spindle surfaces to lift away from the bearing shoe, and in so doing provides more room for lubricant to enter. After the oil has entered between the surfaces, the surface layer of molecules adjacent to the spindle is moving with the spindle, while the surface layer adjacent to the bearing shoe is stationary with it. It is obvious, therefore, that all the lubricating medium between these surface layers is in a continual state of slip or what is known as shear. When the surfaces are relatively close to each other the shear forces in the oil are very great and since the stress in a liquid must be the same in all directions a pressure is built up normal to the surfaces of the bearing shoes and spindle.

One theory of this operation is that in order to support a load the pressure change in the volume must be gradual, and to obtain a gradual change the volume must be wedge shaped with its thickness diminishing in the direction of motion. Equilibrium is reached when the integration of all the pressure elements in the volume is equal to the external load on the spindle. This condition of equilibrium will obtain as long as a copious supply of the lubricating oil is present at the leading edge of the shoe. For best conditions the center of pressure occurs nearer to the trailing edge than to the leading edge of the bearing shoe. Therefore, the rocking shoes are shown with their points of support nearer to the trailing edge.

This type of spindle bearing is adjusted with more clearance than is commonly provided in spindle bearings where great stability is necessary, because the rocking of the shoes during the rotation of the spindle moves the trailing edges of the shoes closer to the spindle, taking up part of the clearance so that the spindle is rigidly and positively positioned radially. Therefore, it is evident when the spindle stops and oil is no longer wiped under the leading edge of the shoes that they are free to rock back, moving the trailing edge away from the spindle. This reestablishes the large initial clearance, making possible a radial shifting of the spindle and boring tool to prevent engagement between the tool and the workpiece during withdrawal of the tool from within the workpiece bore.

With reference now to Fig. 3, the spindle 2 has a radial bore 38 in which is positioned a sliding plunger 39 normally urged outward by a coil spring 40 positioned within the bore. The outer end of the plunger engages and supports an arcuate pad 41, preferably in the form substantially, of one of the rocking shoes, with the periphery of the pad or shoe 41 engaging a portion of the bore 11. The plunger 39 and pad 41 are counterbalanced by a curved member 42 secured as by screws 43 to the spindle 2 substantially diametrically opposite to the pad or shoe 41. The spring and plunger urge the spindle laterally of the housing in a direction opposite to the projection of the boring tool, with the shoe 41 providing a relatively large bearing surface for the end of the plunger.

When the spindle is rotating the wedge shaped film of oil built up between each of the shoes and the spindle causes the spindle to be accurately centered and thus overcomes the effect of the spring 40. When the spindle is stopped, however, oil is no longer wiped in at the leading edge, the pressures which have been built up in the wedge shaped film by the rotation of the spindle are greatly reduced, and the shoes are each free to rock into a position to accommodate an oil film of substantially uniform thickness so that the spring 40, acting through the plunger 39 and shoe 41, tends to move the spindle toward the shoes on the side of the spindle opposite the plunger and the tool 8, and away from the adjacent shoes to a sufficient extent to retract the boring tool from operative position so as not to engage the finished workpiece bore during the withdrawal of the tool therefrom. This amount of lateral movement of the spindle relative to the housing is extremely small, but this slight movement is nevertheless sufficient to remove the boring tool from a position where it can engage the workpiece surface. It will be noted that the plunger 39 extends from the spindle 2 in the same radial direction as the boring tool, and the shoe 41 provides a relatively large bearing surface so that there is no appreciable wear during the operation of the boring head which would result if the pad 41 were omitted and the plunger 39 allowed to engage the bore 11 directly.

With reference to Fig. 4, which shows a modification, the shoe 41 is replaced by a ring 41' and a plunger 39' positioned in the bore 38' in the spindle 2' is urged outwardly by the spring 40' into a groove 44 in the ring. By this arrangement it is unnecessary to provide the counterbalancing member 42 since the ring 41' is necessarily in balance. A stop 45 in the ring 41' extends inwardly into the groove 44 and assures rotation of the ring 41' with the spindle 2' within the housing 1', preventing wear on the end of the plunger.

Fig. 5 shows the invention in a form which is especially useful where the workpiece is rotated and the tool is held stationary; in this arrangement, the housing 1'' has a work-rotating spindle 2'' journalled therein by spaced sets of rocking shoe bearings 3'', only one set being shown. The spindle 2'' has an integral end flange 46 to which a chuck for holding the workpiece may be secured. With this arrangement the spindle 2'' must be shifted in such a direction as to withdraw the workpiece from engagement with the tool. As the tool is in a fixed position radially of the housing 1'' (although it may have an axial movement for traversing the workpiece bore) the spindle 2'' must move laterally, each time that the rotation is stopped, in the same direction within the housing.

To this end, a plunger 47 is positioned in a small radial bore 48 in the housing and is urged by a coil spring 49 within the bore into engagement with a ring 50 freely mounted on the spindle 2''. A pin 51 extends outwardly of said ring into a groove 52 formed therein to hold the ring against rotation during spindle rotation. Although the plunger 47 has no effect upon the spindle 2'' during its rotation, it becomes effective, when the spindle is stopped to shift the spindle laterally within the housing, in a manner similar to that above set forth in connection with Figs. 6 and 7. The plunger 47 is so located that the movement of the spindle will be in a direction to move the workpiece away from the tool, said plunger being diametrically opposed to the tool, and being moved by its spring in the direction of the tool's projection.

This same structure may be incorporated, if desired, in any of the well known types of internal grinding machines to obtain a radial shifting movement between the workpiece and grinding wheel at the completion of each grinding operation. It will be apparent that it is necessary only to locate the plunger 47 in the housing to engage the wheel spindle on the same side as the line of engagement between the wheel and work. If the spindle structure above described is used in the workhead, the plunger 47 is positioned to shift the work spindle in a direction to space the wheel and work radially.

From the foregoing it will be apparent that the present invention provides an arrangement for automatically assuring a slight lateral movement of the boring tool 8 relative to the axis of rotation thereof (or radial retraction of the tool) as soon as the spindle carrying the boring tool is brought to rest, thereby preventing engagement between the tool and the workpiece during the withdrawal of the tool from the workpiece bore. The rocking shoe bearings allow for this slight movement of the boring tool without affecting the rigid support of the spindle when the spindle is rotating.

I claim:

1. In an arrangement of the class described, means for supporting a workpiece, a cutting tool for operation on said workpiece, a rotary spindle carrying one of said elements, a housing in which said spindle is journaled, rocking shoe bearings in said housing for the spindle, said bearings being arranged to provide for a slight lateral play of the spindle within the housing when the spindle is not rotating, and means for shifting the spindle laterally in the housing when the spindle is stopped for a radial retraction of the tool relative to the workpiece surface.

2. In an arrangement of the class described, means for supporting a workpiece, a cutting tool for operation on said workpiece, a rotary spindle carrying one of said elements, a housing in which said spindle is journaled, rocking shoe bearings in said housing for the spindle, said bearings being arranged to provide for a slight lateral play of the spindle within the housing when the spindle is not rotating, and a spring pressed plunger radially positioned in said spindle for urging the spindle laterally of the housing.

3. In an arrangement of the class described, means for supporting a workpiece, a cutting tool for operation on said workpiece, a rotary spindle carrying one of said elements, a housing in which said spindle is journaled, rocking shoe bearings in said housing for the spindle, said bearings providing for a slight lateral movement of the spindle within the housing when the spindle is stationary, a plunger radially positioned in said spindle and projecting in the same direction as the tool, and a spring for pressing the plunger outwardly to move the spindle laterally when the spindle is stopped.

4. In an arrangement of the class described, means for supporting a workpiece, a cutting tool for operation on said workpiece, a rotary spindle carrying one of said elements, a housing in which said spindle is journaled, rocking shoe bearings in said housing for the spindle, said bearings providing for a slight lateral movement of the spindle within the housing when the spindle is not rotating, a plunger radially positioned in said spindle and projecting in the same direction as the tool, a spring for pressing the plunger outwardly to urge the spindle laterally, and a shoe on the end of the plunger, said shoe engaging a surface of the housing.

5. In a boring head, a housing, a spindle in said housing, said spindle having a tool extending laterally at one end thereof, rocking shoe bearings for the spindle, a plunger mounted in the spindle and extending therefrom in the same direction as the projection of the tool, a spring for urging said plunger outwardly, a shoe on the end of the plunger engaging with a surface on the housing, said plunger and spring urging the spindle laterally of the housing, and a counterweight secured to the spindle to balance the weight of the shoe.

6. In a boring head, a housing, a spindle in said housing, said spindle having a tool extending laterally at one end thereof, rocking shoe bearings for the spindle, a plunger mounted in the spindle and extending therefrom in the same direction as the tool, a spring for urging said plunger outwardly, and a ring surrounding the spindle and journalled in the housing, said ring being engageable by the end of the plunger.

7. In a boring head, a housing, a spindle journalled in said housing and projecting from one end thereof, said spindle having a boring tool on the projecting end thereof, bearings for the spindle arranged to provide for a slight lateral play of the spindle when the latter is not rotating, and means exerting a lateral pressure on the spindle for shifting the spindle laterally in the housing in the direction opposite to the projection of the tool from the spindle when the spindle is stopped.

HAROLD L. BLOOD.